United States Patent [19]

Plummer

[11] Patent Number: 4,689,696
[45] Date of Patent: Aug. 25, 1987

[54] HYBRID IMAGE RECORDING AND REPRODUCTION SYSTEM

[75] Inventor: William T. Plummer, Concord, Mass.

[73] Assignee: Polaroid Corporation, Cambridge, Mass.

[21] Appl. No.: 739,534

[22] Filed: May 31, 1985

[51] Int. Cl.[4] .............................................. H04N 9/79
[52] U.S. Cl. .................................... 358/333; 358/906
[58] Field of Search .............. 358/332, 333, 906, 244, 358/335, 310, 345, 111; 360/35.1, 2, 3

[56] References Cited

U.S. PATENT DOCUMENTS

| | | | |
|---|---|---|---|
| 3,475,549 | 10/1969 | Goldmark et al. | 358/333 |
| 3,842,195 | 10/1974 | Takahashi et al. | 358/75 |
| 4,058,832 | 11/1977 | Vagi | 358/244 |
| 4,096,530 | 6/1978 | Plugge et al. | 360/35.1 |
| 4,130,834 | 12/1978 | Mender et al. | 360/35.1 |
| 4,228,465 | 10/1980 | Stone et al. | 358/111 |
| 4,230,408 | 10/1980 | Nigg | 355/35 |
| 4,262,301 | 4/1981 | Erlichman | 358/906 |
| 4,270,853 | 6/1981 | Hatada et al. | 360/2 |
| 4,554,591 | 11/1985 | Kee | 360/2 |

Primary Examiner—Donald McElheny, Jr.
Attorney, Agent, or Firm—John S. Vale

[57] ABSTRACT

A system utilizing aspects of both photography and electronic imaging is provided for recording and reproducing an image of scene in color. A camera component of the system photographically records the image on monochromatic film to provide a high resolution photograph from which electronic luminance signals are derived, and also utilizes an image sensor for providing lower resolution chrominance signals which are recorded on a medium, such as a magnetic stripe, that may be formed on the film unit. The photograph and chrominance signal recording are transferred to a reproduction component of the system which derives the luminance information signals from the photograph and combines it with the chrominance signals to provide three primary color signals which are utilized to drive a hard copy printer or an electronic image display device.

22 Claims, 2 Drawing Figures

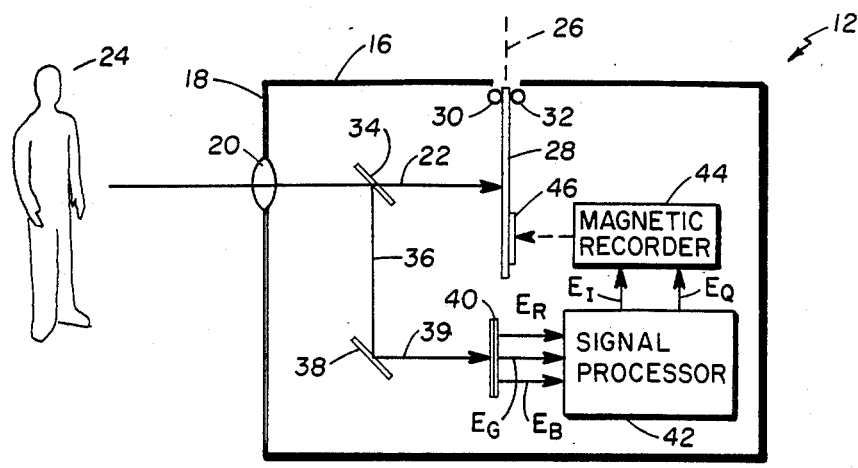
FIG I
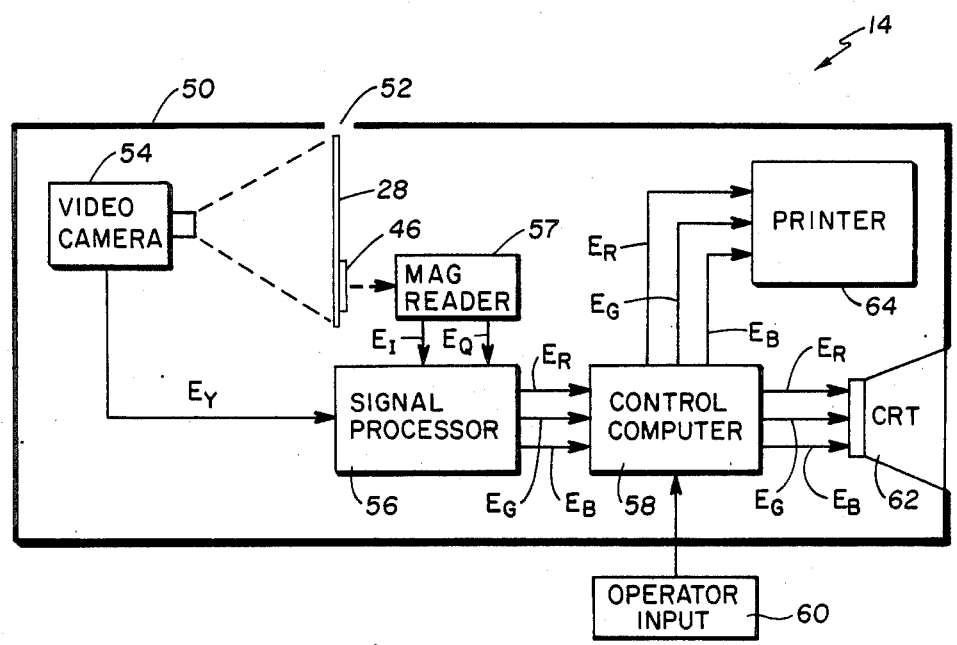
FIG II

HYBRID IMAGE RECORDING AND REPRODUCTION SYSTEM

BACKGROUND OF THE INVENTION

The present invention relates to the field of image recording and reproduction and, more particularly, to a hybrid type of image recording and reproduction system which combines aspects of both photography and electronic imaging.

Electronic still image camera systems are known in the prior art. Typically, the camera utilizes a solid state image sensor, such as a CCD or the like, which employs a matrix array of photosensitive elements for converting an optical image of the scene focused thereon into electronic image signals which define the scene on a pixel by pixel basis. The image signals generally are digitized and then recorded on an appropriate storage medium, such as a magnetic tape or disk. The recorded image may be displayed electronically by feeding the image signals to a display device, such as a CRT, or a "hard copy" print may be obtained by sending the image signals to a printer.

For a representative example of an electronic still image camera which also includes a built-in display screen and printer, reference may be had to U.S. Pat. No. 4,262,301 issued to Irving Erlichman on Apr. 14, 1981.

There are many advantages to be derived from electronic imaging. For example, once the image is converted into digital signal form, the image may be improved or otherwise modified beneficially utilizing a variety of image enhancement algorithms and signal processing techniques. Parameters that may be improved in this way include contrast, image sharpness, color saturation, and balancing of color to better match the spectral characteristics of an intended display or print medium. Also, the digitized image signals may be stored in a data base to facilitate retrieval; several copies of the image may be made to apply different enhancement techniques thereto; and the image signals may be transmitted quickly to remote locations utilizing various types of data communication systems.

Enthusiastic forecasts that a compact, hand held, electronic still image camera would reach the market within a year or two after several product announcements now are being tempered and downplayed because those actively working in this field realize that significant advances in the state of the art relating to solid state image sensors will be necessary before such cameras achieve acceptable image quality and can be manufactured at reasonable cost.

It is envisioned that utilization of a solid state image sensor will be the key to compactness and low cost. However, commercially available solid state image sensors, while small, currently have severe resolution limitations which impair image quality, and are very expensive. At this time, these sensors generally are capable of only dividing an image focus thereon into a matrix array on the order of 512 by 512 pixels. Thus, the resolution of these sensors is orders of magnitude lower than that of photographic film and, not withstanding improvements provided by enhancement techniques, images reproduced from electronic image signals generated by such cameras are relatively coarse in terms of photographic quality.

To electroncially record an image in color, it is necessary to generate three primary color signals, typically red, green, and blue. If the resolving power of commericially available sensors is to be maintained, three sensors must be employed, one for each of the three primary colors, which substantially increases cost. If, in the interest of reducing cost, a single sensor is used in combination with a three color filter array in front of the photosensitive elements, resolution is effectively lowered by one third because only one third of the photosensitive elements "look at" each color.

Because low cost, high resolution, solid state image sensors are not available yet, there is a current need for an alternative approach which will provide a system that is capable of producing high quality images without requiring an image sensor that is beyond the current state of the art.

Therefore, it an object of the present invention to provide a system that may be assembled from existing components and materials and yet is capable of recording and reproducing quality images in color while exploiting the advantages of electronic imaging.

It is another object to provide such a system which records the luminance component of a color image in high resolution and its chromanance component and low resolution, yet is capable of reproducing a high quality color image.

Another object is to provide for such a system which is hybrid in nature in that it combines aspects of both photography and electronic imaging.

Still another object is to provide such a system that does not require a high resolution electronic image sensor to record the luminance component of the image.

Other objects will, in part, be obvious and will, in part, appear hereinafter.

SUMMARY OF THE INVENTION

The present invention provides a system for recording and reproducing a color image of a scene by combining aspects of both photography and electronic imaging.

The system includes a hybrid recording apparatus or camera and a reproduction apparatus or printer. The system is based on the known concept that high resolution red, green, and blue color signals for electronic image reproduction may be generated by combining high resolution luminance information with substantially lower resolution chrominance information using signal processing techniques similar to those employed in composite signal color television broadcasting.

The camera includes means for photographically recording an image of a scene on a monochromatic film unit to provide a photograph (high resolution image) from which electronic image signals representative of the luminance component of the image may be derived, and means for providing and recording electronic signals (low resolution) representative of the chrominance component of the image for later use in combination with the derived luminance signals to provide a color reproduction of the image.

In effect, the film unit takes the place of a high resolution image sensor for recording the luminance information. Because the color information can be of substantially lower resolution, the task of generating the chrominance component may be done with a commercially available low resolution solid state image sensor, and these signals are stored on a magnetic recording medium. Preferably, the film unit is of the self-developing type for fast processing. The magnetic recording medium for storing the chrominance signals may be formed on or attached to the film unit for convenience.

After image recording, the photograph and magnetic medium for storing the chrominance signals are transferred to the reproduction apparatus. It includes means for reading the chrominance signals and means, such as a high resolution black and white video camera or an electro-optical scanner, for converting the optical image information in the photograph into high resolution luminance signals. Means, such as a signal processor are provided for receiving the luminance and chrominance signals and deriving therefrom red, green and blue signals for color image reproduction. The image may be reproduced electronically by feeding the color signals to a display device or a hard copy print may be obtained by feeding the color signals to a printer. The display device and/or printer may be incorporated in the reproduction apparatus or may be separate therefrom.

By employing this hybrid approach, the information required to derive the three color signals may be acquired with existing commercially available materials and components, i.e., black and white film, a low resolution solid state image sensor, a scanner or video camera, and a signal processor. By using the techniques described above, the system embodying the present invention ultimately converts an optical image into electronic image signals which then may be enhanced, stored, or transmitted over communication systems as well as being used for image display or the making of a hard copy print.

BRIEF DESCRIPTION OF THE DRAWINGS

For a fuller understanding of the nature and objects of the present invention, reference may be had to the following detailed description taken in connection with the accompanying drawings wherein:

FIG. 1 is a diagrammatic representation of a hybrid image recording apparatus forming part of an image recording and reproduction system embodying the present invention; and FIG. 2 is a diagrammatic representation of an image reproduction apparatus for use with the recording apparatus of FIG. 1.

DESCRIPTION OF THE PREFERRED EMBODIMENT

The present invention provides a system for recording and reproducing a color image of a scene by combining aspects of both photography and electronic imaging. The system comprises an image recording apparatus or camera 12 diagrammatically illustrated in FIG. 1, and a reproduction apparatus 14 diagrammatically illustrated in FIG. 2.

Camera 12 is a compact, hand held image recording device contained in a housing 16. Mounted in a forward wall 18 of housing 16 is an objective lens 20 for transmitting image bearing light along an internal optical path 22 to provide a focused image of a scene 24 at an exposure plane 26 for exposing a monochromatic film unit 28 supported at an exposure position in plane 26 by conventional film supporting means (not shown). Although not shown in the drawings, camera 12 includes a shutter and diaphragm mechanism just behind lens 20 for regulating the transmission of light along path 22 to control the exposure of the film unit 28.

Film unit 28 may be a conventional high resolution black and white film unit which must be developed by wet processing after exposure, but in a preferred embodiment, it is a self-developing film unit of the type that is processed by advancing it between a pair of pressure-applying rollers 30 and 32 for spreading a processing liquid between predetermined layers of the exposed film unit in a manner that is well known in the photographic art. The use of a self-developing film unit is preferable because it provides the operator with the opportunity to view the result soon after exposure thereby providing the opportunity for a retake if necessary.

As will become apparent later, the exposed and developed film unit 28 provides a high resolution photograph of the scene from which luminance information will be derived when the photograph is transferred to reproduction apparatus 14. The film unit 28 may be of the transparency type that provides a positive image or, preferably, of the reflection print type which the operator may view easily without the need for a transparency viewing device.

In addition to photographically recording a high resolution image of scene 24 on film unit 28, camera 12 is configured to electronically record the chrominance information or component of the image in low resolution (compared to the resolution to film unit 28) for later use in combination with the luminance information to reproduce the image in color.

In the illustrated embodiment, a beam splitter 34 is located in path 22 allowing a portion of the image bearing light to pass therethrough to the exposure plane 26 while reflecting another portion of the light along a second optical path 36 to a mirror 38 which reflects the light along a third optical path 39 to provide a focused image of the scene on a solid state color image sensor 40.

Sensor 40 preferably is a commercially available low resolution device, such as a CCD of the like, which includes a matrix array of photosensitive elements for providing signals indicative of the intensity of light falling thereon. A three-color matrix filter (not shown) is provided over the photosensitive elements so that sensor 40 provides separate output signals $E_r$, $E_g$ and $E_b$ representative of the primary colors red, green, and blue in a manner that is well known in the art. Because the chrominance component of the image is to be recorded in relatively low resolution, the sensor 40 only has to have a resolving power in the range of at most $256 \times 256$ pixels to $512 \times 512$ pixels thereby allowing the use of a sensor 40 that is within the existing state of the art. However, it should be understood that the concept of photographically recording luminance information and electronically recording chrominance information for later combination in the image reproduction mode is not limited to just low resolution chrominance signals. That is, higher resolution chrominance information could be used as well to provide the desired result.

The $E_r$, $E_g$ and $E_b$ signals provided from sensor 40 are fed into a signal processor or matrixing encoder 42 that digitizes and combines the three primary color signals into a composite luminance signal $E_y$ and then, through selective matrixing of the $E_y$ signal with the separate primary color signals, provides encoded chrominance information signals $E_q$ and $E_i$ in a manner that is analogous to generation of encoded chrominance information signals employed in color television systems. This encoding technique substantially reduces the amount of chrominance information that has to be stored by the system.

The chrominance signals $E_q$ and $E_i$ provided from encoder 42 are fed to a video signal recorder 44 which stores or records this information on a magnetic recording medium 46.

While the recording medium may be conventional magnetic tape or a disk, it is preferable to provide a medium that makes it convenient to transfer the chrominance record relating to a particular scene, along with its corresponding photograph, to the reproduction apparatus 14. For example, the magnetic medium may be a small card that has a magnetic stripe on one side thereof and is coated with an activatable adhesive on the opposite side so that the card can be attached to the back side of film unit 28 to keep the luminance and chrominance information together. Alternatively, the film unit 28 may have a magnetic stripe 46 coated thereon or attached thereto at the time of manufacture. In the illustrated embodiment, a magnetic recording stripe 46 is shown formed on the back side of film unit 28, and the dotted arrow from recorder 44 to stripe 46 is intended to indicate that recorder 44 is provided with a linearly translatable recording head that is moved along the stripe 46 to record the chrominance information thereon.

It should be understood that the invention is not limited to recording the chrominance information on magnetic recording medium. Alternatively, camera 12 could be provided with an optical recording system that records the chrominance signals on an optical recording medium that is selectively deformed with the energy output from a laser diode or the like to record signal information thereon.

Although not shown on the drawings, camera 12 also may include a buffer memory between the sensor 40 and the matrixing encoder 42, or between encoder 42 and the recorder 44, to facilitate chrominance signal acquisition and recording.

The image recording and reproduction system 10 takes advantage of the fact that high resolution color signals $E_r$, $E_g$, and $E_e$ may be generated in the reproduction apparatus 14 from high resolution luminance information in combination with relatively low resolution chrominance information utilizing signal processing techniques that are very much like those employed in commercial color television broadcasting.

For example, in the American television system, defined by the National Television System Committee (NTSC), the composite color television signal comprises a wide band (4 MHz) high resolution picture or luminance signal and two relatively narrow band (low resolution) chrominance signals $E_i$ (1.5 MHz) and $E_q$ (0.5 MHz) which are modulated on a subcarrier of approximately 3.6 MHz in the upper end of the 4 MHz wide picture channel.

This scheme was developed after extensive tests indicated that the human eye perceives changes or transitions of luminance much more acutely than color transitions. Thus, by limiting the amount of chrominance information that is transmitted, many more television channels can be packed into the bandwidth allocated for transmission without materially degrading the quality of the color image.

In the NTSC system, a color camera generates wide band or high resolution primary color signals $E_r$, $E_g$, and $E_b$. These three signals are combined in a matrixing circuit to produce a broad bandwidth (4 MHz) luminance signal $E_y$. The matrixing circuit also selectively mixes $E_y$ with $E_r$, $E_g$, and $E_b$ to produce broad bandwidth (4 MHz) chrominance signals $E_i$ and $E_q$. But, because it has been determined that this much color information is not necessary to provide high quality color signals at the receiver, the chrominance signals are filtered to reduce their bandwidth before they are combined with $E_y$ for transmission. The $E_i$ signal is limited to a bandwidth of 0–1.5 MHz and the $E_q$ signal is limited to a bandwidth of 0–0.5 MHz.

At the receiving end of the system, the $E_i$ and $E_q$ signals are matrixed with the $E_y$ signal to generate the three color signals $E_r$, $E_g$ and $E_b$ for driving the receiver display tube. Even though a substantial amount of the chrominance information is removed from the $E_i$ and $E_q$ signals prior to transmission, the signals $E_r$, $E_g$, and $E_b$ which are regenerated at the receiver have sufficient information to provide a picture that is perceived as a high resolution color image.

The camera 12 uses a different approach to signal acquisition and processing to achieve substantially the same results as the commerical television system. Rather than having to initially generate high resolution (wide band) primary color signals and then filtering out chrominance information from the $E_i$ and $E_q$ signals, camera 12 records the high resolution luminance component on film unit 28 and generates the lower resolution chrominance information directly with a low resolution image sensor 40, thereby eliminating the need for a high resolution image sensor.

To reproduce a color image recorded by camera 12, the film unit 28 bearing the photographic image of the scene and the magnetic medium 46 having the low resolution chrominance signals $E_i$ and $E_q$ corresponding thereto are transferred to the reproduction apparatus 14.

Apparatus 14 includes a box-like housing 50 having a slot or opening 52 therein through which the illustrated film unit 28 having the magnetic recording media 46 on the back side is inserted to locate it at a reading or signal acquisition station where it is supported by film support means (not shown). In embodiments where the film unit 28 and magnetic recording media 46 are not coupled together, separate reading stations may be provided for each.

Apparatus 14 includes means for deriving electronic luminance signals $E_y$ from the photographic image on film unit 28 located at the reading position. In the illustrated embodiment, such means include a compact high resolution black and white video camera 54 which is focused on the photograph and provides luminance signals $E_y$ to a signal processor or matrixing decoder 56. As an alternative to camera 54, the optical image on film unit 28 may be derived into electronic luminance signals utilizing any one of a variety of commercially available electro-optical scanning devices. For example, the scanning device could be a high resolution CCD line scanner that is moved vertically relative to the photograph to read a line at a time. Or it could be a laser scanning system wherein a spot of light is scanned over the surface of the photograph and reflectance level is read with a photocell detector to provide the luminance signal $E_y$.

Behind the film unit 28 is a magnetic signal reading device 57 which includes a read head that is moved relative to the magnetic recording medium 46 for reading the chrominance signals $E_i$ and $E_q$ into the signal processor 56.

Processor 56 includes means for digitizing the luminance signals $E_y$ and combining them with the chrominance signals $E_i$ and $E_q$ to derive the three primary color signals $E_r$, $E_g$, and $E_b$ by matrixing the input signals in the reverse of the manner described previously. From signal processor 56, the color signals are fed into a microcomputer 58 which is configured to control operation of the various components of apparatus 14 and has a memory section for storing the color signals defining the image.

Computer 58 receives instructions from an operator input device 60, such as a keyboard or the like, and is operative to direct the color signals to a display device such as the illustrated CRT 62, or to a hard copy printer 64. The display device 62 and printer 64 may be incorporated in apparatus 14, or they may be separate units which are connected to appropriate output ports of computer 58.

Preferably, computer 58 is provided with image enhancing software for selectively modifying the color signals to improve or otherwise beneficially change such parameters as contrast, image sharpness, color saturation, magnification and color balance. The computer 58 also preferably is capable of storing the color signals on a disk and providing the signals in the form for transmission over data communication systems.

The CRT may serve as an electronic image display device which allows the operator to view and compose the image prior to printing a hard copy and/or it also may serve as the optical input for a system that records the image on photographic film by sequentially recording the red, green and blue components of the image through corresponding red, green and blue filters as is well known in the art.

The printer 64 may be any one of a variety of color printers that operate in a graphics mode in response to digital image signal input. Such printers include dot matrix impact printers; color pen, thermal and ink jet printers; and scanning printers or facsimile devices that convert the image signals back into optical form (light) to record the image on a photosensitive film.

The components and materials utilized in system 10 are available commercially and the signal processing techniques described above have been proven in the video and image processing art. However, the present invention combines these components, materials and techniques in a new way to exploit the benefits of electronic imaging without the need for technology that is beyond the current state of the art.

In the illustrated embodiment, electronic signals processing has been described as being analogous to techniques used in the NTSC color television system. However, it should be understood that other known signal processing techniques may be used instead to produce the same results.

For example, instead of providing a red, green and blue matrix filter in front of sensor 40 to generate the $E_r$, $E_g$ and $E_b$ signals, the filter may be a white, yellow and cyan matrix filter to provided signals $E_w$, $E_y$ and $E_c$ which are then processed by matrixing to provide the necessary chrominance information. Alternatively, more than three input colors may be used to generate the chrominance information, for example by providing a white, green, yellow and cyan matrix filter in front of sensor 40 as disclosed in U.S. Pat. No. 4,477,832. Also, it may be possible to generate the necessary chrominance information by using only two input colors, such as yellow and cyan.

Since certain of other changes or modifications may be made in the above described system and/or components thereof without departing from the spirit and scope of the invention involved herein, it is intended that all matter contained in the above description or shown in the accompanying drawings shall be interpreted as illustrative and not in a limiting sense.

What is claimed is:

1. A compact hybrid image recording apparatus for recording an image of a scene, said apparatus comprising:
    a housing for containing components of said apparatus, said housing being of a size configured for hand held operation or said apparatus;
    means, contained by said housing, for photographically recording an image of the scene on a monochromatic film unit to provide a photograph, having a given resolution, from which electronic signals representative of the luminance component of the image can be derived by a separate image reproduction apparatus;
    means, contained by said housing and including a solid state image sensor having a resolution capability lower than said given resolution, for providing electronic signals representative of the chrominance component of the image of the scene; and
    means, contained by said housing, for recording said chrominance signal on a non-photographic recording medium for later use by said reproduction apparatus in combination with said derived luminance signals to provide a color reproduction of the image of the scene.

2. The recording apparatus of claim 1 wherein said means for recording said chrominance signals is configured to record said chrominance signals on an optical recording medium.

3. The recording apparatus of claim 1 wherein said means for recording said chrominance signals is configured to record said chrominance signals on a magnetic recording medium.

4. The recording apparatus of claim 3 wherein the magnetic recording medium is formed on the film unit.

5. The recording apparatus of claim 3 wherein the magnetic recording medium is configured to be attached to the photograph subsequent to the recording of said chrominance signals thereon.

6. The recording apparatus of claim 1 wherein said image sensor provide signals representative of three primary color components of the image, and said means for providing said chrominance signals includes a matrixing encoder which processes said primary color signals and provides two output signals that represent the chrominance component of the image in encoded form.

7. The recording apparatus of claim 1 wherein the film unit is of the self-developing type and said apparatus further includes means for processing the film unit.

8. The recording apparatus of claim 1 having optical means, including an objective lens, for providing a focused image of the scene on the film unit and said image sensor.

9. An image reproduction apparatus for reproducing a color image of a scene from a monochromatic photographic image of the scene and a non-photographic record of electronic signals that represent the chrominance component of the image, said apparatus comprising:
    means for deriving electronic signals from the photograph that are representative of the luminance component of the image of the scene;

means for reading the chrominance signals from the non-photographic record;

means for receiving said luminance and chrominance signals and deriving therefrom color signals that are representative of three primary color components of the image of the scene; and means responsive to said color signals for reproducing a color image of the scene.

10. The reproduction apparatus of claim 9 wherein said means for deriving said luminance signals from the photograph includes a video camera.

11. The reproduction apparatus of claim 9 wherein said means for deriving said luminance signals includes an electro-optical sensing device that scans the photographic image to provide said luminance signals.

12. The reproduction apparatus of claim 9 wherein said means responsive to said color signals is a printer for providing a hard copy print of the image.

13. The reproduction apparatus of claim 9 wherein said means responsive to said color signals is an electronic image display device.

14. The reproduction apparatus of claim 9 wherein said means for deriving said color signals includes a signal processor which utilizes matrixing techniques to derive said color signals from said luminance and chrominance signals.

15. The reproduction apparatus of claim 9 wherein said luminance signals define a high resolution representation of the luminance component of the image and said chrominance signals define a lower resolution representation of the chrominance component of the image.

16. A system for recording and reproducing a color image of a scene, said system comprising:

a hand held image recording apparatus including:
(a) a housing for containing components of said apparatus said housing being of a size configured for hand held operation of said apparatus;
(b) means, contained by said housing, for photographically recording an image of the scene on a monochromatic film unit to provide a photograph, having a given resolution, from which electronic signals representative of the luminance component of the image can be derived by a separate image reproduction apparatus;
(c) means, contained by said housing and including a solid state image sensor having a resolution capability lower than said given resolution, for providing electronic signals representative of the chrominance component of the image of the scene; and
(d) means, contained by said housing, for recording said chrominance signals on a non-photographic recording medium for later use by said reproduction apparatus in combination with said derived luminance signals to provide a color reproduction of the image of the scene;

in combination with an image reproduction apparatus including;
(a) means for deriving electronic signals from the photograph that are representative of the luminance component of the image of the scene;
(b) means for reading the chrominance signals from the non-photographic record;
(c) means for receiving said luminance and chrominance signals and deriving therefrom color signals that are representative of three primary color components of the image of the scene; and
(d) means responsive to said color signals for reproducing a color image of the scene.

17. The system of claim 16 wherein said means responsive to said color signals is a printer for providing a hard copy print of the image.

18. The system of claim 16 wherein said means responsive to said color signals is an electronic image display device.

19. The system of claim 16 wherein said means for deriving electronic signals from the photograph includes a video camera.

20. The system of claim 16 wherein said means for deriving electronic signals from the photograph includes an electro-optical sensing device that scans the photographic image to provide said luminance signals 21. The system of claim 16 wherein the recording medium on which said chrominance signals are recorded is on the film unit.

22. The system of claim 16 wherein said reproduction apparatus further includes means for modifying said color signals for image enhancement purposes.

* * * * *